(12) United States Patent
Stemmle et al.

(10) Patent No.: US 8,923,940 B2
(45) Date of Patent: Dec. 30, 2014

(54) SYSTEM WITH A THREE PHASE SUPERCONDUCTIVE ELECTRICAL TRANSMISSION ELEMENT

(71) Applicant: Nexans, Paris (FR)

(72) Inventors: Mark Stemmle, Hannover (DE); Beate West, Hannover (DE)

(73) Assignee: Nexans, Paris (FR)

( * ) Notice: Subject to any disclaimer, the term of this patent is extended or adjusted under 35 U.S.C. 154(b) by 139 days.

(21) Appl. No.: 13/763,834

(22) Filed: Feb. 11, 2013

(65) Prior Publication Data

US 2014/0051581 A1    Feb. 20, 2014

(30) Foreign Application Priority Data

Mar. 1, 2012    (EP) ..................................... 12290069

(51) Int. Cl.
*H01F 6/06* (2006.01)
*H01B 12/16* (2006.01)
*H01B 12/02* (2006.01)
*H01B 12/06* (2006.01)

(52) U.S. Cl.
CPC ............... *H01B 12/16* (2013.01); *H01B 12/02* (2013.01); *H01B 12/06* (2013.01); *Y02E 40/641* (2013.01)
USPC ........................................ 505/163; 505/230

(58) Field of Classification Search
CPC .... H01F 6/065; F17C 13/007; G01R 33/3815
USPC .................... 505/163, 230; 174/125.1
See application file for complete search history.

(56) References Cited

U.S. PATENT DOCUMENTS

| 2008/0164048 A1* | 7/2008 | Hirose ..................... 174/15.5 |
| 2008/0179070 A1* | 7/2008 | Gouge et al. ............. 174/15.5 |
| 2008/0293575 A1* | 11/2008 | Hirose et al. ............ 505/230 |
| 2010/0230126 A1* | 9/2010 | Stemmle et al. ......... 174/33 |

FOREIGN PATENT DOCUMENTS

WO    2004013868    2/2004

* cited by examiner

*Primary Examiner* — Colleen Dunn
(74) *Attorney, Agent, or Firm* — Sofer & Haroun, LLP

(57) ABSTRACT

A system with a three phase superconductive electrical transmission element is indicated, in which three superconductive electrical phase conductors are arranged insulated relative to each other and concentrically relative to each other, and in which a thermally insulated tubular cryostat is arranged which has a free space for conducting a cooling medium therethrough. The transmission element has at least two identically constructed cables (K1, K2), each of which has three electrical phase conductors (L1, L2, L3) which are insulated relative to each other and arranged concentrically relative to each other. The phase conductors (L1, L2, L3) of the two cables (K1, K2) are electrically switched in parallel in such a way that always one phase conductor of the one cable is connected to the phase conductor of the other cable.

4 Claims, 2 Drawing Sheets

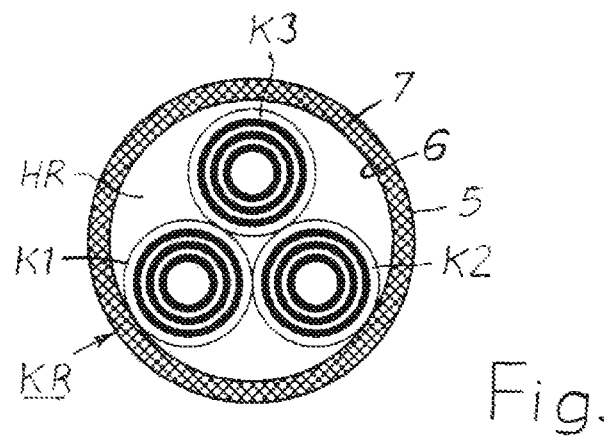
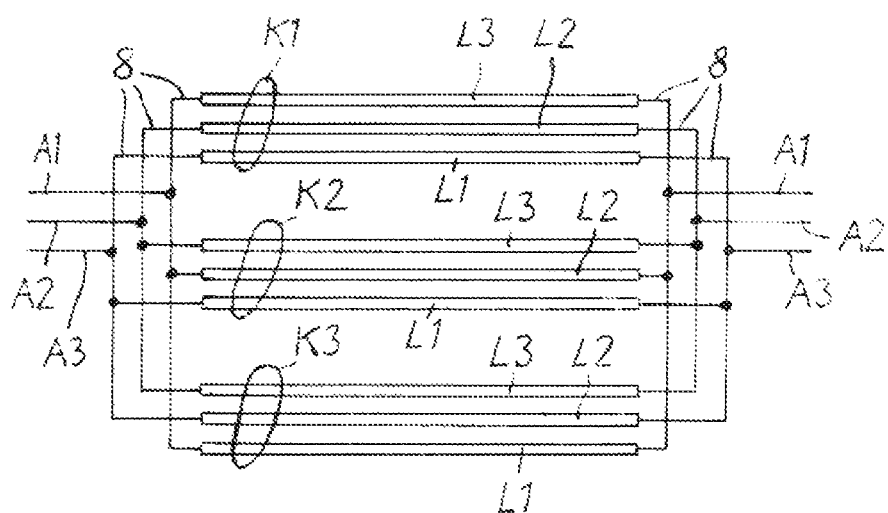

SYSTEM WITH A THREE PHASE SUPERCONDUCTIVE ELECTRICAL TRANSMISSION ELEMENT

RELATED APPLICATION

This application claims priority to European Patent Application No. 12 290 069.9, filed on Mar. 1, 2012, the entirety of which is incorporated by reference

BACKGROUND

1. Field of the Invention

The invention relates to a system with a three phase superconductive electrical transmission element, in which three superconductive electrical phase conductors are insulated relative to each other and concentrically arranged relative to each other, and which is arranged in a thermally insulated tubular cryostat which has a free space for passage of a cooling medium therethrough (WO 2004/013868 A2).

2. Description of the Related Art

Superconductive cables have in today's technology electrical conductors of a composite material which contains ceramic material which at sufficiently low temperatures changes over into the superconductive state. The electrical direct current resistance of an appropriately constructed conductor is zero with sufficient cooling as long as a certain voltage is not exceeded. Suitable ceramic materials are, for example, BSCCO (bismuth-strontium-calcium-copper oxide) as a material of the first generation or ReBCO (rare earth-barium-copper oxide), particularly YBCO (yttrium-barium-copper oxide), as materials of the second generation. Sufficiently low temperatures for placing such a material into the superconductive state are, for example, between 67K and 90K. Suitable cooling agents are, for example, nitrogen, helium, neon, and hydrogen or mixtures of these materials.

The known system according to the above mentioned. WO 2004/013868A2 has as the transmission element a superconductive electrical cable in which three phase conductors are arranged insulated relative to each other and concentrically relative to each other. With the inclusion of a further insulating layer, a neutral conductor is additionally placed as the fourth conductor around the three phase conductors. The compact arrangement with four conductors of superconductive material is placed in a cryostat and, during operation of the transmission system, is cooled in order to achieve the superconductivity. The individual phase conductors consist of several layers of superconductive bands. The number of bands, and thus, the conductor cross-sections, depend on the power to be transmitted.

OBJECTS AND SUMMARY

The invention is based on the object of simplifying the construction of a transmission element for a system of the above described type.

In accordance with the invention, this object is met
in that the transmission element has at least two identically constructed cables, each of which has three superconductive electrical phase conductors arranged insulated and concentrically relative to each other,
and that the phase conductors of the two cables are electrically switched in parallel, in such a way that a phase conductor each of the one cable is connected to the phase conductor of the other cable.

As a result of the construction of the transmission element of at least two cables, the cross-section of the phase conductor of the two cables can be constructed smaller as compared to the single-part version of the transmission element, resulting in a corresponding simplified manufacture. The cables are of identical construction. For this purpose, a three phase cable having a long length can be manufactured, wherein cable lengths having a predetermined length of cables to be connected to each other are severed. The manufacture of the transmission element for the system is further simplified as a result. When the phase conductors of the cables are dimensioned appropriately, substantially greater power can be transmitted as compared to the known system. The electrical losses are reduced relative to the known system with the power being equal because smaller magnetic fields occur in the cables. in addition, no magnetic influence occurs between the cables.

In a preferred embodiment, three identically constructed cables are used for the transmission element of the system whose phase conductors are connected electrically in parallel with cyclical exchange of their location. Consequently, the electrical parameters are the same for each phase and the system is also electrically symmetrical.

The total forces occurring during the thermal contraction when. the system is cooling are then reduced if the cables are stranded together.

BRIEF DESCRIPTION OF THE DRAWINGS

An embodiment of the subject matter of the invention is illustrated in the drawings.

In the drawing:

FIG. 4 shows an embodiment of the system, also in a sectional view, which has been expanded as compared to the embodiment of FIG. 2.

FIG. 5 schematically shows an electrical connection of the cables illustrated in FIG. 4

DETAILED DESCRIPTION

The system according to the invention is supposed to have as a transmission element at least two identically constructed cables whose phase conductors are switched in parallel. In the following, a system with three cables is taken into consideration as a preferred embodiment. In this connection, initially the principal construction of the superconductive cables used in the system shall be explained with the aid of FIG. 1.

Figure 1:
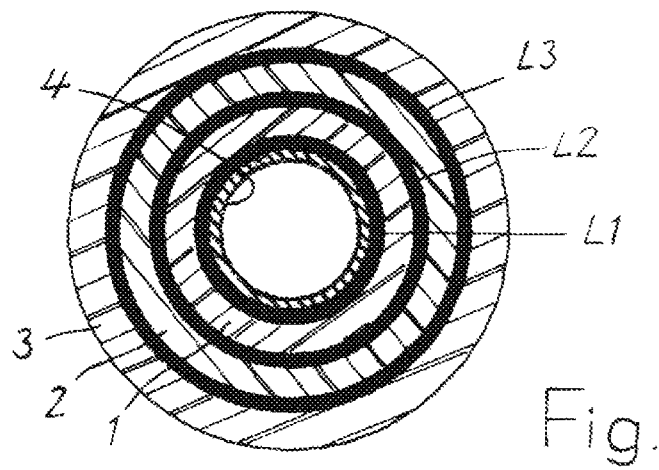
FIG. 1 shows in a sectional view the principal construction of a superconductive cable which can be used in the system according to the invention.

The superconductive cable according. to FIG. 1 has three superconductive phase conductors L1, L2 and L3 arranged concentrically relative to each other. The phase conductors L1 and L2 are insulated relative to each other by means of layers 1. and 2 of insulation material. Another layer 3 of insulation material is arranged around the outer phase conductor L3, wherein a neutral conductor, not illustrated, could be arranged additionally above the layer 3. Such a neutral conductor can be, for example, when loaded with an asymmetrical current system, a common return conductor for all phase conductors. The inner phase conductor L1 is mounted around a support 4 which, in the illustrated embodiment, is constructed as a pipe. The support 4 can also be a solid strand. It is also possible to equip a cable with a tubular support 4 and the other cable with a solid support 4. The support 4 may be of metal, particularly of high grade steel, or also of synthetic material. As a pipe of metal it may also be undulated transversely of its longitudinal direction.

Figure 2:
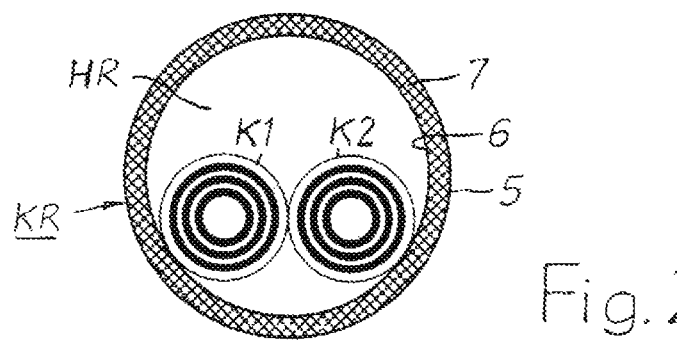
FIG. 2 shows a sectional view of an embodiment of the system according to the invention, on a smaller scale compared to FIG. 1.

FIG. 2 shows a system with a superconductive transmission element which, in the illustrated embodiment, is composed of two cables K1 and K2. The cables are of identical construction which corresponds to the cable according to FIG. 1. Preferably, the cables are stranded together with a long pitch. The appropriate pitch length is, for example, between 5×D and 15×D with the diameter D of the cable. The cables K1 and K2 are arranged in a cryostat KR which also encloses a hollow space HR for conducting a cooling agent there through. When the carrier 4 of at least one of the cables K1 or K2 is a pipe, the cooling agent can additionally also be conducted through the pipe.

The cryostat KR is composed, for example, of two metal pipes 5 and 6 arranged at a distance concentrically relative, to each other, wherein a vacuum insulation is arranged between the pipes. It is supposed to have at least one thermally insulated pipe of metal. The pipes 5 and 6, and the possibly present thermally insulated pipe, are preferably of high grade steel. Advantageously, they may be undulated transversely of their longitudinal direction.

Figure 3:
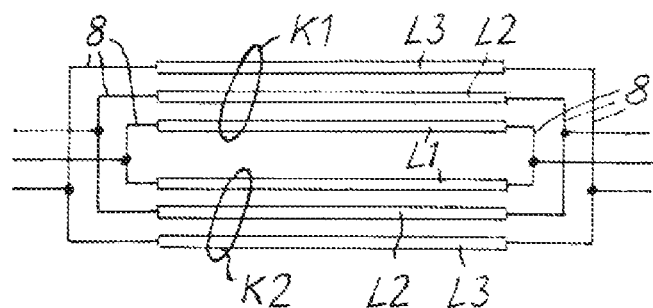
FIG. 3 schematically shows the electrical connection of the cables used in the system.

In FIG. 3, a possible electrical connection of the phase conductors L1, L2 and L3 of the two cables K1 and K2 are indicated. The phase conductors L1 of the two cables are switched electrically in parallel in the same manner as their phase conductors L2 and L3, so that, when connected to a voltage source and when further connecting to additional cables, they act like a phase conductor with an appropriate conductive cross section in deviating from the illustration in FIG. 3 of the drawing, for example, also the phase conductor L1 of one of the two cables K1 or K2 could be connected to the phase conductor L3 or also to the phase conductor L2 of the respectively other cable. For the connection of the phase conductors, superconductive wires 8 can be used, which preferably contain ReBCO or BSCCO as the superconductive material.

In a preferred embodiment, the transmission element of the system according to FIG. 4 consists of three superconductive cables K1, K2 and K3 which are advantageously once again stranded together with a long pitch. These three cables are also constructed identically with a construction corresponding to the cable according to FIG. 1. The three phase conductors L1, L2 and L3 of the cables are in the following, for the sake of simplicity and clarity referred to as "inner conductor L1," "middle conductor L2" and "outer conductor L3."

The cables K1, K2 and K3 can essentially be electrically conductively connected to each other in such a way that their inner conductors L1 and their middle conductors L2 as well as their outer conductors L3 are switched in parallel. However, in a preferred embodiment corresponding to the illustration in FIG. 5, the through-connection of the phase conductors of the cables K1, K2 and K3 takes place with a cyclical exchange of the locations of the phase conductors. As a result, the transmission element becomes electrically symmetrical. Therefore in normal operation, it can be excluded that the cables influence each other magnetically.

In FIG. 5, in analogy to FIG. 3, one again only the three phase conductors of the three cables are indicated. They may be connected to each other through superconductive wires 8, in which ReBCO or BSCCO is preferably used as the superconductive material, for example, as follows:

The outer conductor L3 of the cable K1 is connected to the middle conductor L2 of the cable K2 and the inner conductor L1 of the cable K3. The middle conductor L2 of the cable K1 is connected to the inner conductor L1 of the cable K2 and the outer conductor L3 of the cable K3. In addition, the inner conductor L1 of the cable K1 is connected to the outer conductor L3 of the cable K2 and the middle conductor L2 of the cable K3. In this manner, the phase conductors are switched parallel to each other with a possibility for exchanging locations. Consequently, at the entry and the exit of the transmission element, three superconductive connecting conductors A1, A2 and A3 respectively, with a cross section corresponding to the electrically conducting cross sections, are available.

The invention claimed is:

1. A system comprising:
    a three phase superconductive electrical transmission. element, in which three superconductive electrical phase conductors are arranged insulated relative to each other and concentrically relative to each other; and
    said three phase superconductive element arranged in a thermally insulated, tubular cryostat which has a free space for conducting a cooling medium therethrough, wherein
    the transmission element has at least two identically constructed cables, where each of the cables has three superconductive electrical phase conductors arranged insulated relative to each and concentrically relative to each other, and
    wherein the phase conductors of the two cables are switched electrically in parallel in such a way that always one phase conductor of the one cable is connected to a phase conductor of the other cable.

2. System according to claim 1, wherein the transmission element is constructed of three cables.

3. System according to claim 2, wherein the phase conductors of the three cables are each connected electrically conductively with cyclical location exchange to each other such that the inner phase conductor of a first cable is connected to the middle phase conductor of a second cable and further on to the outer phase conductor of a third cable, where the three cables constitute, for the through-connection of their phase conductors, the first cable as well as the second cable as well as the third cable.

4. System according to claim 1, wherein the cables are stranded together.

* * * * *